Mar. 3, 1925. 1,528,688
T. L. OLER
DUMP BODY
Filed April 7, 1923
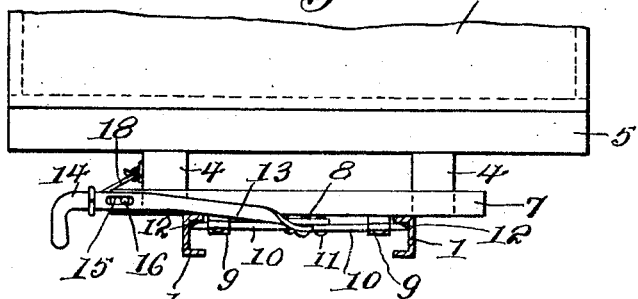
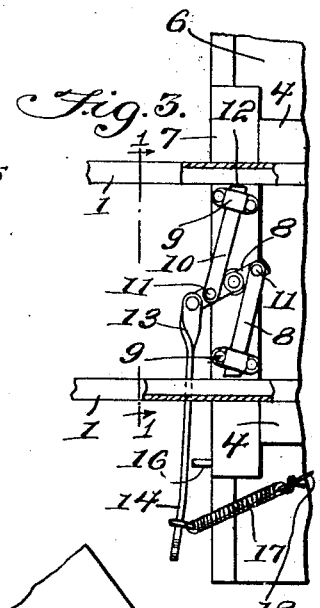
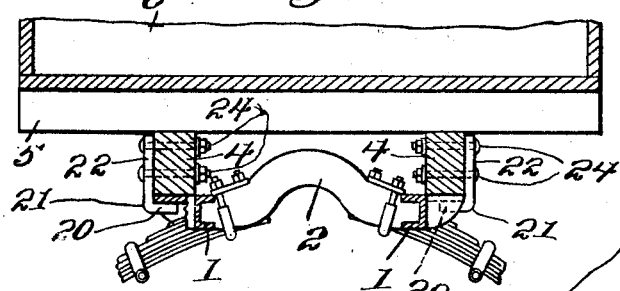
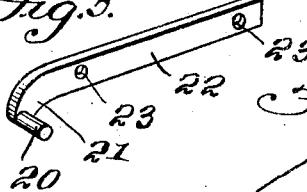
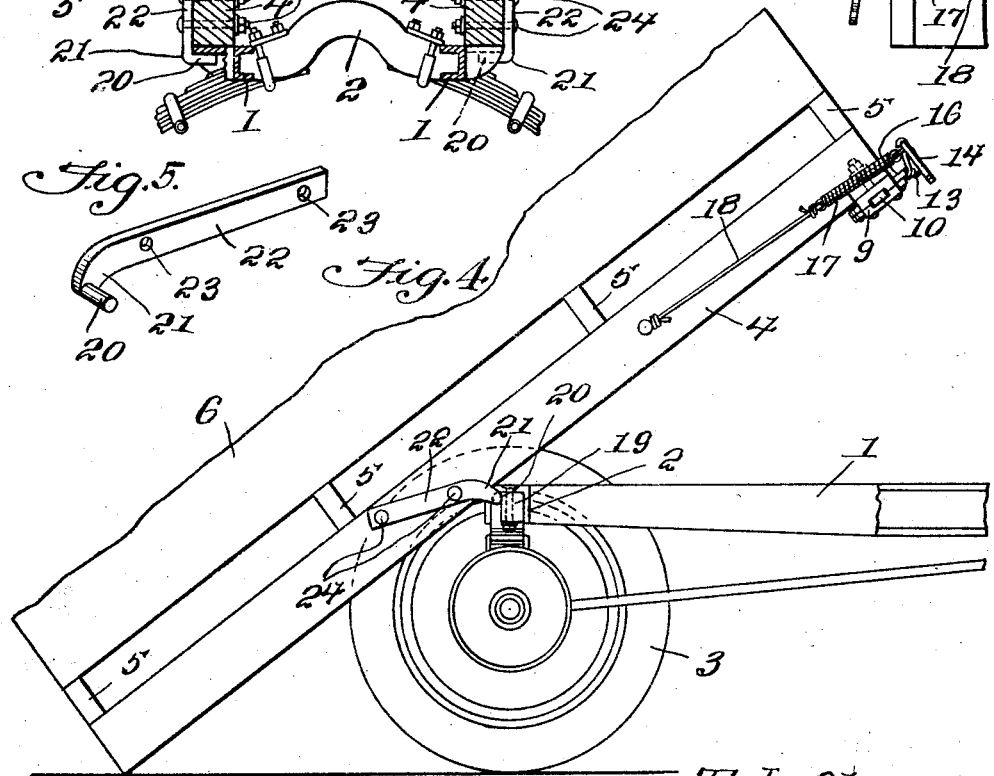
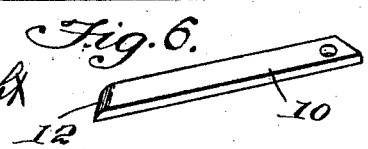
T. L. Oler
INVENTOR
BY Victor J. Evans
ATTORNEY
J. L. Wright
WITNESS:

Patented Mar. 3, 1925.

1,528,688

UNITED STATES PATENT OFFICE.

THOMAS L. OLER, OF GALESBURG, KANSAS.

DUMP BODY.

Application filed April 7, 1923. Serial No. 630,666.

*To all whom it may concern:*

Be it known that I, THOMAS L. OLER, a citizen of the United States, residing at Galesburg, in the county of Neosho and State of Kansas, have invented new and useful Improvements in Dump Bodies, of which the following is a specification.

Because of the wide range of use of trucks on a frame the stock size of commercial dump truck bodies have not been found acceptable to the farmer, and consequently he has found it to his interest to make or have made truck bodies of size and proportion most suitable for his particular use. It may therefore be considered one of the primary objects of this invention to produce a frame pivotally mounted upon the chassis of a motor truck and provided with novel means for locking the same at rest on the chassis, said means being releasable to permit of the swinging of the frame to dumping position, and wherein bodies of different or suitable sizes may be readily secured on the frame.

It is a further object to produce a dump body for vehicle frames having simple means for pivotally securing the same to the rear axle spring bolster of the machine and also means, operable from one side of the body for securely locking the body to the side irons of the vehicle frame, said means when released being of such construction as to permit of the operator holding the body at any desired inclination on the vehicle frame to either dump the contents from the body or to allow the travel of stock into the body.

A further object is to produce a device for this purpose which shall be characteristic of simplicity in construction, cheapness in manufacture, coupled with strength and durability as well as through efficiency in operation.

To the attainment of the foregoing and other objects which will present themselves as the nature of the invention is better understood, reference is to be had to the drawings which accompany and which form part of this application.

In the drawings:—

Figure 1 is a sectional view approximately on the line 1—1 of Figure 3, looking in the direction of the arrows.

Figure 2 is a transverse sectional view through the wagon body and the frame beams which support the body, looking toward but directly at the rear of the rear bolster.

Figure 3 is an enlarged fragmentary inverted plan view showing the locking means in releasing position.

Figure 4 is an elevation showing the body in dumping position.

Figure 5 is a perspective view of one of the pintle carrying irons.

Figure 6 is a similar view of one of the locking bolts.

My improvement is designed for use upon that class of truck frames having transversely arranged rear bolsters for the springs that support the power wheels thereof.

Referring now to the drawings in detail, the numeral 1 designates the channeled side bars of the frame or chassis of an automobile, 2 the rear bolster thereof in which is secured the central portion of the arched spring that supports the axle housing for the drive wheels 3.

In carrying out my invention I make use of a substantially rectangular frame that comprises parallel longitudinal beams 4 held in proper spaced relation by transverse beams 5. The beams 4 are spaced away from each other a distance slightly greater than the distance between the channeled side members 1 of the chassis. The transverse beams may, and preferably do, project a determined distance beyond the sides of the longitudinal beams, and are designed to support thereon a body 6.

The beams 4 of the frame are connected together, at their forward ends by a transverse beam or cleat 7, the latter having pivotally secured on its center a link 8. Also secured on the underface of the cleat 7 to the opposite sides of the link 8 there are angularly arranged sockets 9 that serve as guides for bolt members 10 each of which being pivoted, as at 11, an equal distance from the pivot that connects the link to the cleat. The outer ends of the plates which constitute the bolts 10 are cut at an angle and have their upper corners bevelled as at 12. By this arrangement the bolts 10 may be readily slid over the upper horizontal flange of the channeled side members 1 of the automobile frame, when the link 8 is swung in a manner which will presently be described.

The link 8 is extended beyond one of the pivots 11, and to the end thereof there is pivoted a lever 13. The lever, at a suitable distance from its pivotal connection with the link 8 is given a half twist, and is extended at an angle toward the cleat 7 and from thence is straightened as at 14. The straight or handle end of the lever has a slot 15 therethrough through which there is normally passed a pin 16 secured on the outer face of the cleat 7. Also to the straight end of the lever there is connected one end of a helical spring 17, the opposite end of which being preferably connected to a rod or wire 18 secured to one of the beams 4 of the frame.

In further carrying out my invention I secure in the ends of the channeled bolster 2, by the same bolts that assists in sustaining the spring therein, blocks 19. These blocks only partly close the ends of the bolster, leaving sufficient space between one side of the said blocks and one of the side flanges of the bolster for the reception of short shafts or trunnions 20 formed on the curved or angle ends 21 of the plates 22. Each plate has a plurality of openings 23 through which are passed bolts 24 that also pass through the side beams 4 of the frame. In this manner it will be seen that the frame and the body carried thereby is pivotally associated with the automobile chassis in a cheap but thoroughly efficient manner.

By swinging the pivoted lever 14 against the tension of the spring 17 to draw the said lever beyond the pin 16, an outward pull exerted on the lever will swing the link 8 to withdraw the bolts 10 from locking position, permitting the body supporting frame to swing to dumping position with respect to the chassis, and incident to manual resistance offered by the operator the body carrying frame may be sustained at desired inclinations with respect to the vehicle. The body and frame are returned to normal position, preferably by the operator grasping the lever, as by so doing the bolts are held retracted and a push on the lever will turn the link 8 to again slide the bolts 10 to locking position. When the lever is released the spring 17 will draw the same toward the cleat 7, bringing the pin 16 into the slot 15 thereby locking the lever against accidental operation.

With my improvement it will be noted that bodies of various sizes and designs best suited for various uses on a farm may be readily secured to the frame; that the frame is easily hingedly connected to the chassis and that the sliding bolts securely lock the frame and body thereon. The construction is extremely simple, may be cheaply manufactured and marketed, but, I wish it understood that I do not desire being restricted to the precise details of construction herein set forth, as I hold myself entitled to such changes and modifications thereover as fall within the scope of what I claim.

Having thus described my invention, what I desire to claim as new is:

In combination with the chassis of an automobile in which a transversely arranged spring carrying bolster for the drive wheels of the machine is secured to the channeled side members of the chassis, of a frame, plates having trunnions secured to the sides of the frame and having their said trunnions received in the channeled bolster for hingedly securing the frame on the chassis, blocks in the channeled bolster for contacting the trunnions to prevent sliding of the frame on the chassis, in combination with means for locking the frame on said chassis.

In testimony whereof I affix my signature.

THOMAS L. OLER.